United States Patent [19]
Butler

[11] Patent Number: 4,513,734
[45] Date of Patent: Apr. 30, 1985

[54] HIGH EFFICIENCY FLAT PLATE SOLAR ENERGY COLLECTOR

[76] Inventor: Robert F. Butler, 18805 Orange Ave., Sonoma, Calif. 95476

[21] Appl. No.: 521,923

[22] Filed: Aug. 10, 1983

[51] Int. Cl.³ .............................................. F24J 3/02
[52] U.S. Cl. .................................. 126/439; 126/438; 126/417
[58] Field of Search ................. 126/438, 439, 424, 417

[56] References Cited

U.S. PATENT DOCUMENTS 3,923,039  12/1975  Falbel ................................. 126/424
4,102,329  7/1978   Smith, Jr. ......................... 126/424 X
4,196,720  4/1980   ElDifrawi et al. ............. 126/436 X Primary Examiner—Larry Jones
Attorney, Agent, or Firm—Flehr, Hohbach, Test, Albritton & Herbert

[57] ABSTRACT

A concentrating flat plate collector for the high efficiency collection of solar energy. Through an arrangement of reflector elements, incoming solar radiation, either directly or after reflection from the reflector elements, impinges upon both surfaces of a collector element.

5 Claims, 5 Drawing Figures

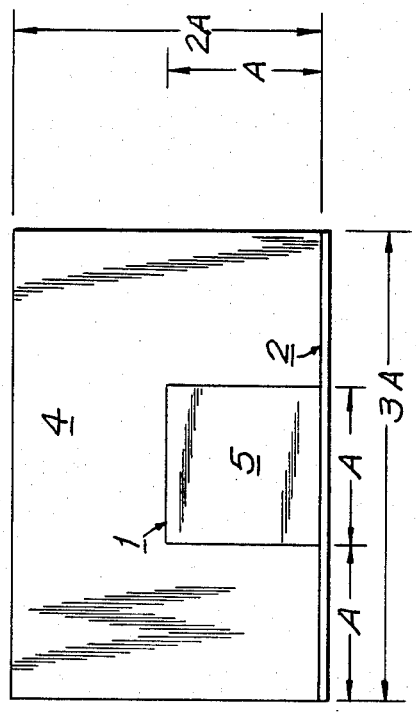
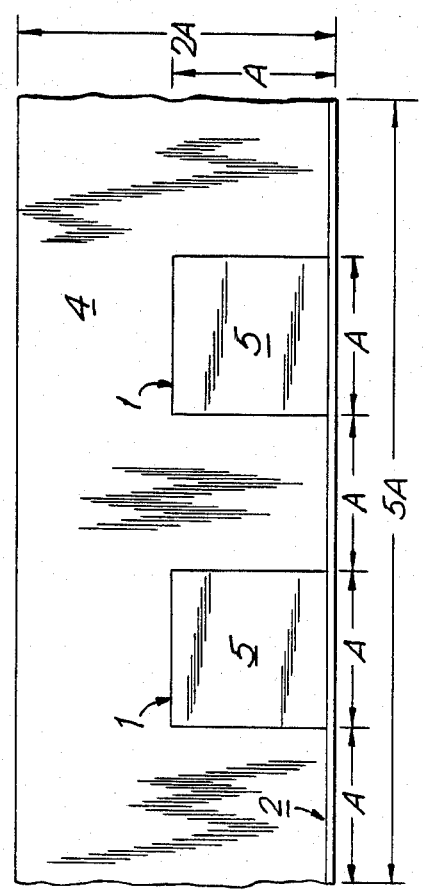
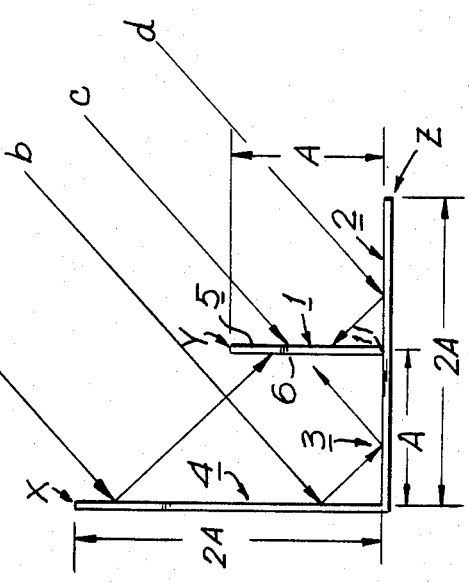
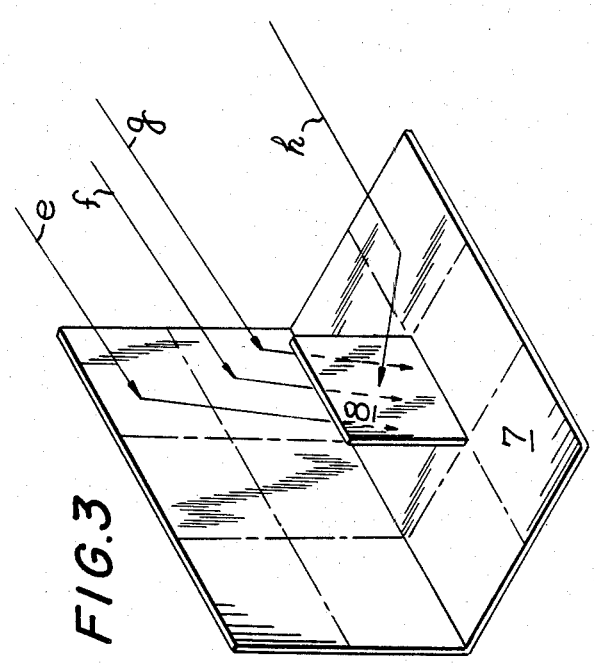

HIGH EFFICIENCY FLAT PLATE SOLAR ENERGY COLLECTOR

BACKGROUND OF THE INVENTION

This invention relates to a solar energy collector, and more particularly to a flat plate solar collector which effects the efficient collection of solar energy and which is economical to manufacture, utilize and maintain.

In recent years there has been intensive activity in the area of solar energy collection system design. The devices of the prior art succeed to varying degrees in capturing a portion of the sun's energy for use in the heating of water or for other purposes. Often, however, problems of system inefficiency, complexity, high initial costs, high maintenance expenses, excessive weight and short useful lives have offset the advantages to be gained from the devices.

One category of the prior art encompasses collectors incorporating curved collector and/or reflector surfaces. Representative of this group are U.S. Pat. Nos. 3,179,105; 3,923,381; 3,974,824; 4,002,499; 4,088,116; 4,214,573; British Pat. No. 325,179; and French Pat. No. 2,352,260. The designs of these collectors are advantageous in that the curved collector or reflector surfaces concentrate the amount of solar radiation impinging upon the collector element surfaces. A price must be paid for this enhanced efficiency, however, in the form of increased fabrication costs in the production of the curved elements, and increased installation expenses in the calibration and tracking of such complex elements.

A second prior art category includes devices that maintain optimum alignment of the collector surfaces regardless of the sun's position, through the use of tracking systems. Illustrative of these inventions are U.S. Pat. No. 509,393 and German Pat. No. 26 20 469. The principal drawbacks of these systems are higher cost, substantially greater complexity, and considerable system maintenance expense.

A third approach is exemplified by the disclosures of U.S. Pat. Nos. 3,841,302; 4,077,391; 4,122,833; 4,127,104; 4,329,978; French Pat. Nos. 2 379 776 and 2 419 477; and German Pat. No. 30 02 852. In general, these devices utilize relatively simple non-tracking flat plate collector elements. However, only one side of the collector element receives solar radiation, leading to low collector efficiency. Furthermore, the space behind the non-insolated collector surface must be heavily insulated, to reduce heat losses.

Systems have also been disclosed for reflecting incident solar radiation from planar reflectors onto the opposite faces of a collector element. One such system is described in U.S. Pat. No. 4,136,674, wherein solar radiation is reflected from plural planar reflectors onto the successive faces of a central collector or absorber tower, as a boat supporting the reflecting surfaces is rotated about the tower. The design of this and similar systems is, however, relatively complex, imposing substantial capital, installation and operating costs, and substantial maintenance problems.

It is among the objects of the present invention to provide a simple, low maintenance, inexpensive and effective means for circumventing many of the problems of the prior art, for the efficient collection of solar energy.

SUMMARY OF THE INVENTION

The desired objectives are met in the present invention by the provision of a high efficiency solar energy collector embodying a flat plate collector element so oriented that the sun's rays impinge thereon at oblique incident angles; and a pair of flat plate reflector elements disposed substantially at right angles to and reflecting upon the opposite faces of the collector element adjacent the base thereof, the dimensions of the reflector elements being sufficient to reflect the maximum amount of solar radiation incident on the plane thereof onto the collector element. In addition, the collector incorporates a third, flat plate reflector element disposed substantially parallel to the collector element and spaced therefrom by a distance at least equal to the length of the adjacent reflector element, the dimensions of the third reflector element being sufficient to reflect the maximum amount of solar radiation incident on the plane thereof, either directly or indirectly by reflection from the adjacent reflector, upon the back face of the collector element.

The device of the present invention is a unique concentrating solar collector. Whereas concentrating collectors having parabolic or other curved reflector surfaces concentrate only direct parallel solar radiation on the collector surface, the present device concentrates all radiation, whether direct or indirect (as from sky light).

The respective collector and reflector elements are arranged so that when the device is properly oriented with respect to the sun, radiant solar energy will impinge, either directly or by reflection from one or more of the reflector elements, on both sides of the flat plate collector element.

BRIEF DESCRIPTION OF THE DRAWINGS

The invention may be more readily understood by reference to the following detailed discussion, in conjunction with the accompanying drawings, wherein:

FIG. 1 is a schematic, side elevation of an embodiment of the solar collector of the present invention;

FIG. 2 is a schematic, front elevation of the device of FIG. 1;

FIG. 3 is a schematic, front elevation of an alternative, preferred collector embodiment, incorporating two or more collector elements;

FIG. 4 is an isometric projection partially illustrating the impingement of solar radiation on the collector elements of either of the embodiments of FIGS. 1-2, or FIG. 3.

DESCRIPTION OF THE PREFERRED EMBODIMENTS

Figure 5:
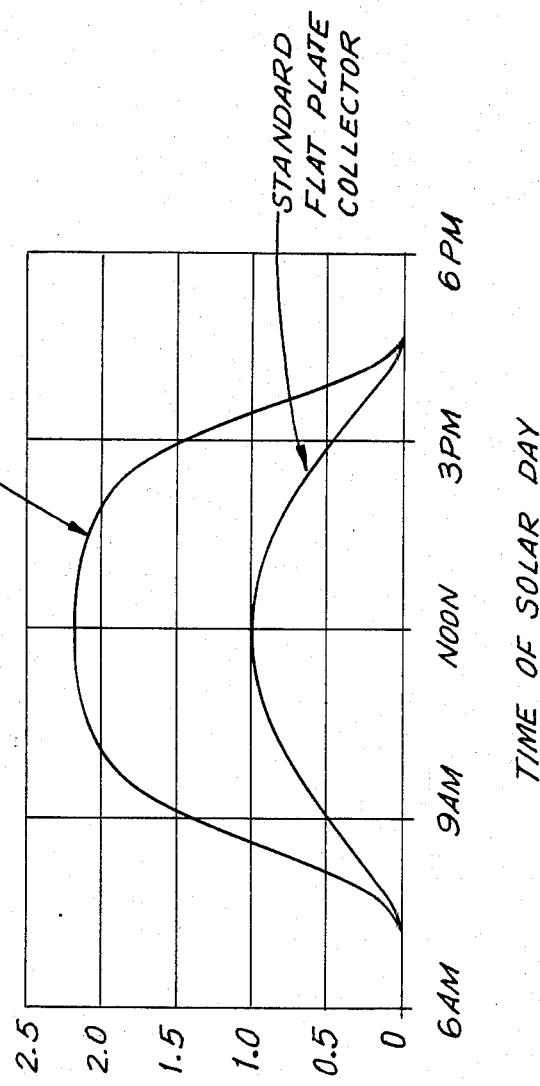
FIG. 5 is a plot comparing the heat collection efficiency of a conventional flat plate collector with that of the present invention.

Referring to FIGS. 1 and 2, a collector element 1 with height A and width A is depicted in juxtaposition with a pair of flat plate reflectors 2 and 3 adjacent to base 11 of collector element 1. The base 11 may abut reflectors 2 and 3 or, alternatively, may be slightly spaced therefrom, e.g., to increase the effective collector surface, facilitate improved maintenance, or the like. Collector element 1 has a first or front face 5 reflecting upon reflector 2, and an opposite or back face 6 reflecting upon reflector 3. Each of the reflectors 2 and 3 extends generally perpendicular to element 1 (illustratively for a distance A). A third, flat plate reflector 4, with an illustrative height 2A, is arranged so as to be parallel to collector element 1. As illustrated in the drawing, elements 1-4 are fixed in position relative to one another, the reflector element 4 being generally perpendicular to reflector elements 2 and 3. It will be understood that the precise angle between these elements may be varied, if desired.

The collector element 1 may be of any conventional type, e.g., it may comprise a heat conductive material such as copper, aluminum, steel, an appropriate plastic, or other material in which appropriate fluid channels or conduits are formed for the passage of a heat exchange fluid. The collector may be glazed, if desired. The specific collector element design is not a part of the present invention, and may readily be determined by those having ordinary skill in the solar heating art. Similarly, reflector elements 2-4 may comprise any flat plate reflectors conventionally employed in the art and may, for example, be provided of any available reflective surfaces such as a metallic foil, sheet aluminum, mirrored glass or any other suitable surface.

The collector element (and, hence, the collector system) is generally oriented at an angle of from about 30° to 60°, preferably about 45°, to the sun's rays for maximum energy collection efficiency. The angle of the collector relative to the horizontal plane will, of course, vary, depending upon the particular geographic location of the installation.

The specific orientation of the collector may be varied depending upon the particular application desired. For example, when the collector is employed for space heating, the tilt angle (the angle between reflectors 2 and 3 and the horizontal plane) should be adjusted so that the angle of incidence of the sun's rays at about 10-11 A.M. (sun time) during the coldest period of the solar year (about January 21st in the northern hemisphere and about July 21st in the southern hemisphere) is at 45° from the plane of the collector for maximum efficiency over the solar day. This setting may be adjusted, either manually or automatically, if desired, to maximize solar energy collection for any particular part of or for the entire solar year. It has been found that this orientation provides maximum energy collection during the coldest period of the year, with reduced energy collection in the summer when overheating could otherwise damage the collector.

As shown in FIG. 1, in use the collector element receives solar radiation directly (as by ray c), and by reflection from reflectors 2, 3 and 4 on the opposite faces of the collector element. Hence, representative rays a and d, after undergoing a single reflection from reflector surfaces 2 and 3, impinge on the opposite faces 5 and 6, respectively, of collector element 1. Ray b undergoes double reflection from reflector 4, to reflector 3, and then to collector element 1.

In a preferred embodiment of the collector, increased collector capacity may best be achieved by employing an array of collector elements, as shown in FIG. 3, each having a width A and each being separated from the next by the reflector elements over a distance A. The spacing between adjacent collector elements permits the passage of incoming solar radiation which, after reflection from reflector element 4, impinges upon the rear surface of collector element 1. This enhanced solar radiation collection leads to a substantial reduction in costly collector element materials.

Regardless of whether a single collector element or an array of such elements is employed, the distance between the outer edge of the outermost collector element, and the outer edge of reflectors 2, 3 and 4 is preferably equal to A. On the other hand, greater distances increase the duration of collection to insure optimum efficiency during even the longest solar days. The configuration illustrated, however, assures the efficient collection of solar radiation during the early and late periods of the daylight (when solar radiation is more oblique to collector element 1 and reflector 4). FIG. 4 shows this late or early day light collection in isometric perspective, light rays e, f, g and h being obliquely incident on reflector 4 and being reflected upon collector element 1. In this manner, the need for costly and complex tracking equipment is eliminated.

From the preceding it will be seen that in the preferred embodients illustrated in FIGS. 1 and 2, and FIG. 3, the collector element 1 has a height A and a width A, the reflectors 2 and 3 have lengths A and widths 3A. Finally, the reflector 4 has a height 2A and a width 3A. These configurations and others are readily obtained by employing individual reflector and collector units 7 and 8 (see FIG. 4) having lengths and widths A, which are interconnected as desired. By unitizing the reflector and collector elements, efficient and economical mass production is facilitated.

While the preceding dimensions are presently preferred, it will be understood that the specific dimensions of elements 1-4 may be varied as desired. Thus, the dimensions of the individual collector and reflector elements may vary from as little as ½ (or less) to as much as 4 (or more) times the unit dimensions illustrated herein, depending upon the specific application of the device.

Definition of a dimensionally specific embodiment herein is impractical, since numerous variables influence the design of optimal collector arrays. The specific application (e.g., for space heating or cooling, as a water heater, for photovoltaic applications, or for other purposes), geographical location (i.e., whether in Maine or Arizona), the nature of the structure wherein the collector is to be installed, and the type of construction materials are only some of the factors that would have to be known and considered for optimization for any particular purpose.

Important advantages flow from the use of the present invention. First, the design provides more than twice the heat absorption capacity of a normal, single collection surface flat plate collector having the same size and active element, tilted at its optimum angle. This marked improvement in efficiency is the result of combining direct radiation with reflected radiation from reflectors 2, 3 and 4. The reason for this enhanced energy collection capability may be readily understood by reference to FIG. 1. The radiation collection advantage of the collector is determined by simple geometric principles to be the ratio of the total collection area to the area of one face of the collector element or 2.8:1. More simply, for a collector element of width 1, the advantage is the ratio of a line defined by points X, Y and Z (FIG. 1) to the height of the collector element. In practice, the heat energy collection advantage is reduced by the fact that reflector surfaces are imperfect. For oxidized aluminum, 80% reflection efficiency would be expected, and thus the overall efficiency of the collector would be $0.80 \times 2.8$, or about 2.25 times that of a conventional single face flat plate collector.

A second advantage follows from the increased heating efficiency of the present invention. Because of the high efficiency of the collector, higher system temperatures may be obtained, or larger volumes of water or other heat transfer media may be heated to a given temperature. Alternatively, a smaller collector may be used in a given application, while maintaining the energy output of a larger conventional flat plate collector. This efficiency advantage may be seen graphically by reference to FIG. 5.

Moreover, since both surfaces of the collector element are irradiated, insulation is unnecessary. In conventional flat plate collectors, insulation of the non insolated surface of the collector element is required to reduce heat losses.

It will be understood that various changes may be made in the preferred embodiments of the solar collector described herein without departing from the scope of the present invention. Accordingly, it is intended that the preceding description be construed as illustrative only.

What is claimed is:

1. A high efficiency solar energy collector, which comprises:
   (a) a flat plate collector element having two faces for the collection of solar radiation and so oriented that the sun's rays impinge thereon at oblique incident angles;
   (b) a first, flat plate reflector element disposed substantially at right angles to and reflecting upon a first face of the collector element adjacent the base thereof, the dimensions of the reflector element being sufficient to reflect the maximum amount of solar radiation incident on the plane thereof onto the first face of the collector element;
   (c) a second, flat plate reflector element disposed substantially at right angles to and reflecting upon the opposite face of the collector element adjacent the base thereof, the dimensions of the second reflector element being sufficient to reflect the maximum amount of solar radiation incident on the plane thereof on said opposite face of the collector element; and
   (d) a third, flat plate reflector element disposed substantially parallel to the collector element and spaced therefrom by a distance at least equal to the length of the second reflector element disposed substantially perpendicular to the collector element, the dimensions of the third reflector element being sufficient to reflect the maximum amount of solar radiation incident on the plane thereof, either directly or indirectly by reflection on said second reflector element, onto said opposite face of the collector element.

2. The solar collector of claim 1, wherein the collector element is oriented at an angle from 30° to 60° to the sun's rays.

3. The solar collector of claim 1, wherein the outer edges of the first, second and third reflector elements extend beyond the width of the collector element by distances at least equal to said width to assure efficient solar collection.

4. The solar collector of any of claims 1, 2 or 3 which incorporates a plurality of spaced collector elements, each of said collector elements having reflector elements (b), (c) and (d) associated therewith, and said reflector elements extending through the spaces intermediate the collector elements.

5. The solar collector of any of claims 1, 2, or 3, comprising a plurality of interconnected units defining the respective collector and reflector elements.

* * * * *